Dec. 28, 1965  H. O. SCHMIDT  3,225,747
MULTICOLOR PEN, PARTICULARLY A MULTICOLOR BALL POINT PEN
Filed April 30, 1963  7 Sheets-Sheet 1

INVENTOR.
HANS OTTMAR
SCHMIDT
BY Jacob L. Rollin
ATTORNEY

Dec. 28, 1965  H. O. SCHMIDT  3,225,747
MULTICOLOR PEN, PARTICULARLY A MULTICOLOR BALL POINT PEN
Filed April 30, 1963                                      7 Sheets-Sheet 3

INVENTOR:
HANS OTTMAR
SCHMIDT
by
Jacob L. Kollin
ATTORNEY

Dec. 28, 1965    H. O. SCHMIDT    3,225,747
MULTICOLOR PEN, PARTICULARLY A MULTICOLOR BALL POINT PEN
Filed April 30, 1963    7 Sheets-Sheet 5

INVENTOR.
HANS OTTMAR SCHMIDT
BY Jacob L. Kollin
ATTORNEY

Dec. 28, 1965  H. O. SCHMIDT  3,225,747
MULTICOLOR PEN, PARTICULARLY A MULTICOLOR BALL POINT PEN
Filed April 30, 1963  7 Sheets-Sheet 7

INVENTOR.
HANS OTTMAR SCHMIDT
BY
Jacob L. Kollin
ATTORNEY

United States Patent Office

3,225,747
Patented Dec. 28, 1965

3,225,747
MULTICOLOR PEN, PARTICULARLY A
MULTICOLOR BALL POINT PEN
Hans Ottmar Schmidt, St. Georgen,
Black Forest, Germany
Filed Apr. 30, 1963, Ser. No. 276,797
4 Claims. (Cl. 120—42.13)

The invention relates to multicolor pens and in particular to multicolor ball point pens, in which any desired color cartridge may be pushed out of a housing and brought into writing position by suitable manipulation, and in which the previously used cartridge is returned to the rest position when a writing cartridge of another color is chosen, as the newly chosen color cartridge is brought into writing position.

The invention relates to multicolor writing implements, in which there are provided pressure elements under spring action for bringing the respectively chosen color cartridges into the writing and then into the rest position by means of intermediate members. Depending on the position of the latter in such writing implements, a plurality of pins which carry the different color cartridges are displaceable in the lower part of a housing. Arranged above these are swingable push rods actuable by means of pressure elements which coact with the respective underlying cartridge carrying pins in a diagonal or horizontal position.

The heretofore known multicolor writing implements of this type are either too primitive or complicated in design, so that they do not function dependably and are too expensive to manufacture.

The invention is directed to a multiple color writing implement of the above-mentioned type, which consists of comparatively few uncomplicated parts and structural groups, which may be employed with the most varied designs, which will have a long life span and will function satisfactorily and in a trouble-free manner.

The invention comprises a unitary device for choosing, displacing, and guiding back the color cartridge, which is mounted rigidly but detachably in a casing and which may be employed with various types of housings, closure elements and outer moving parts, as desired.

According to a particularly simple constructional development of the invention, the device serving for choosing, advancing and retracting the color cartridge comprises a displaceable pressure pin, which is under the influence of a conical spring arranged in a bushing threaded into the casing in operating position and in the rest position, with a control pendulum mounted on the spring longitudinally limited thereby and rotatable therein, a guide part positioned at the forward end of the casing with a cartridge-bearing pin longitudinally displaceable in the longitudinal bores of the guide part under the influence of coil springs and provided with joints at its rear end and a locking guide ring positioned at the guide part.

The invention further has for its object the construction of the multiple writing implement in such a manner that it may be provided with two, three, four or more color cartridges, while a secure movement of the lowest color cartridge may be obtained by a corresponding construction of the lower pendulum end as well as of the guide elements.

A particularly advantageous embodiment of the invention has for its object the simplification of the function in such a manner that it is only necessary to actuate the pressure member once, for selecting a new cartridge after turning the diagonally or horizontally held implement into the position corresponding to the new cartridge.

Further objects of the invention and the means serving to solve it according to said invention will become apparent from the following description in connection with the accompanying drawings.

Figure 1:
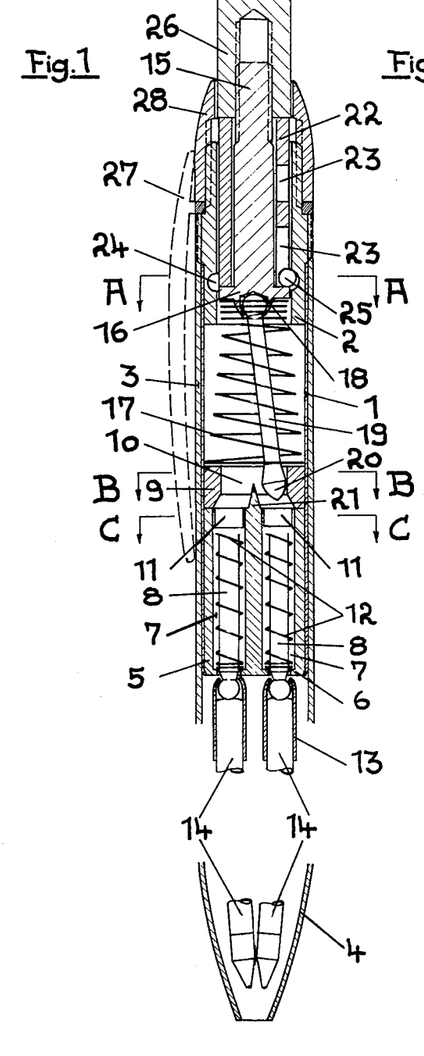
FIG. 1 is a longitudinal cross-section of a multicolor ball point pen, with all parts retracted.
Figure 2:
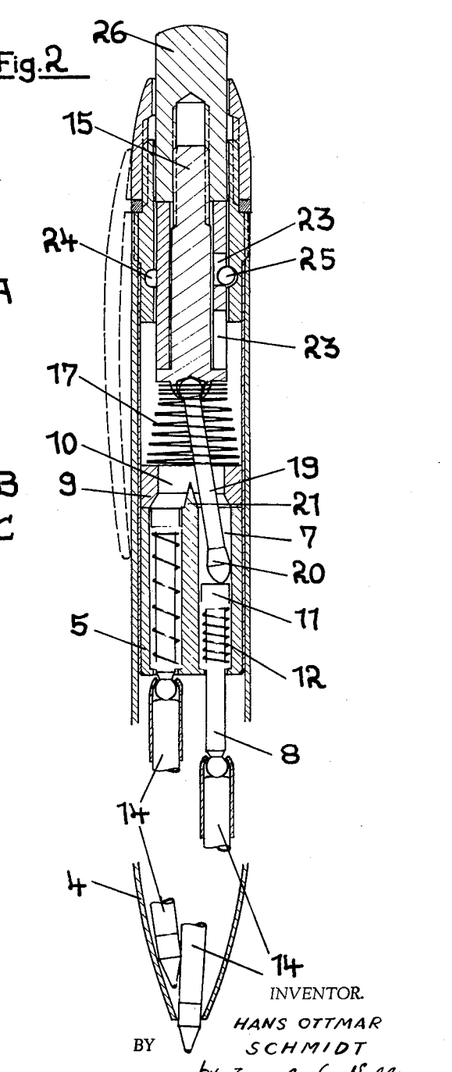
FIG. 2 is a view similar to that of FIG. 1, with the parts in operating position.

Referring now to the figures in detail, the multicolor ball-point pen shown in FIGS. 1 and 2 comprises a container 1 provided with a circular edge at the forward end, the container being rigidly connected at its distal end with a threaded bush 2. A slim cylindrical housing 3, of metal or plastic, is screwed onto the bush and extends forwardly in a somewhat conical point. This comprises in its forward end an opening for the forwardly pushed writing cartridge at a particular time. A guide part 5 is finally inserted in the container 1 at its forward circular edge, the guide part 5 comprising two, three, four or more longitudinal bores 7 for cartridge pins 8, said bores being open at their rear and partly closed at their forward ends by means of collars 6. Behind it is disposed a guide ring 9 with a recess 10 which extends conically forward towards the bores 7 of the guide part 9.

The cartridge carrier pins 8 are each provided at their inner ends with a shoulder 11 against each of which abuts a spiral spring braced against collar 6. The carrier pins 8 are each provided at their inner ends with a shoulder 11, against each of which abuts a spiral spring braced against collar 6. The carrier pins 8 are thus under pressure which seeks to push back these pins, from the writing into the retracted position. At the outer spherically formed ends of cartridge carrying pins 8, there are provided correspondingly flanged small rotatable tubes 13, which receive the color cartridges.

In the rearward portion of container 1, or within the bore of bush 2, there is provided a movable pressure pin 15, the travel of which is limited in the longitudinal and circular directions. The pin 15 is under the influence of a conical spring 17 at its forward circular flanged end which urges the pin back. It comprises a support 18 for the spherical rearward end of a control pendulum 19, the forward frusto-conical ball-like end 20 of which extends into the recess 10 of the guide ring in the rest position and can swing around in the latter about a central conical projection 21.

The pressure pin 15 is screwed together with a casing 22 which surrounds it without contacting and which is mounted on its ring flange 16 and which comprises a somewhat heart-shaped guide bushing 23 for a detent ball 25 displaceable in an inner circular recess 24 of the threaded bush 2. A pressure element 26 is screwed to the rear end of the pressure pin 15, said pressure element serving simultaneously for securely screwing the curved casing 22. A locking casing 28 is screwed onto the rear end of the threaded bush 2 through the intermediate insertion of a securing clip 27 which surrounds the pressure member 26. The locking casing 28 has radial color markings opposite the corresponding color cartridges.

Figure 3:
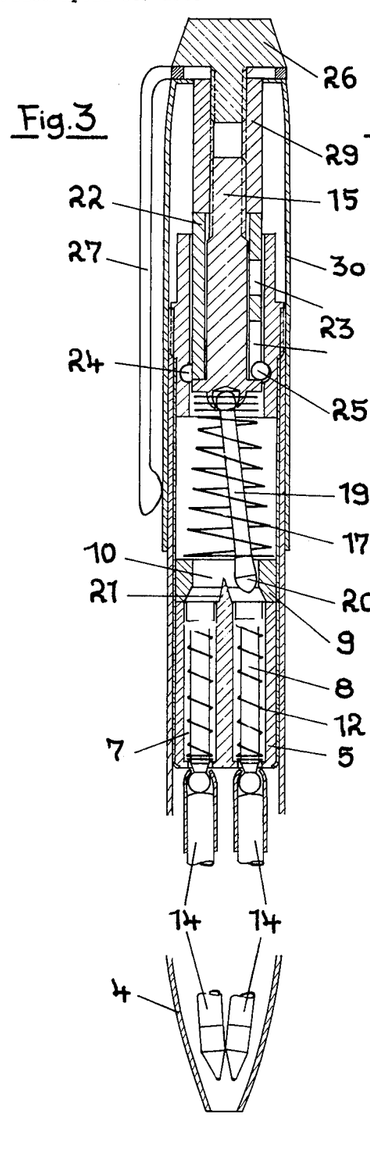
FIG. 3 is a longitudinal cross-sectional view of a variant of the multicolor ball-point pen with all parts retracted.
Figure 4:
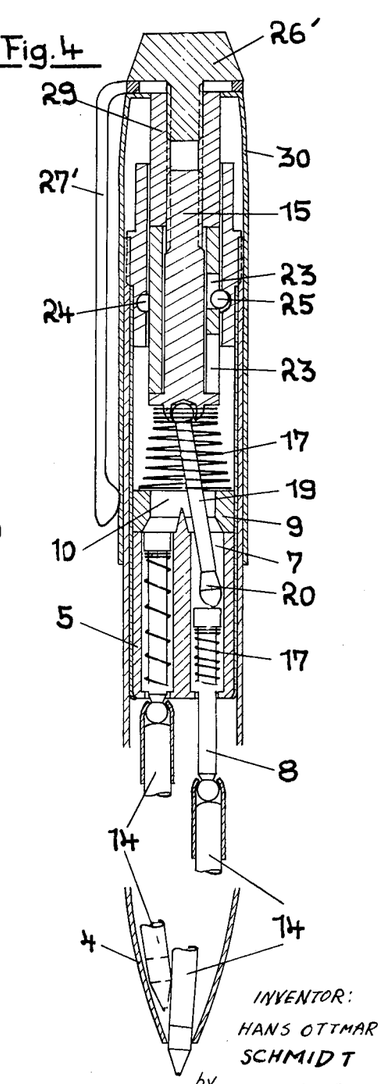
FIG. 4 is a view similar to that of FIG. 3 with the parts in operative position.
Figure 5:
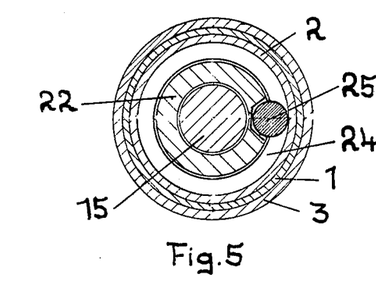
FIG. 5 is a cross-sectional view taken on line A—A of FIG. 1.
Figure 6:
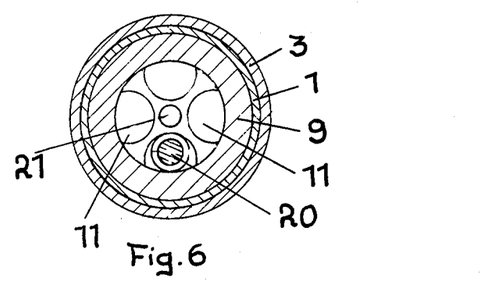
FIG. 6 is a cross-sectional view taken on line B—B of FIG. 1.

The multicolor ball point pen according to FIGS. 3 and 4 differs from the similarly described multicolor pen only by a different design and arrangement of the pressure element. Here, instead of a locking casing 28 a threaded casing 29 is screwed onto the pressure pin 15 which serves for securing the curved casing 22. A long movable casing 30 is mounted on the threaded casing which tightly encloses the housing 3, and which is provided with color markings. In the inner thread of the threaded casing 29 there is screwed in a pressure element 26' through the intermediate insertion of a securing clip 27', which simultaneously securely clamps the sliding casing 30.

The device operates as follows:

In the rest position according to FIGS. 1 and 3, the ball-like forward end 20 of the guide pendulum 19 is disposed in the recess 10 of the guide ring 9 opposite the collar of the carrier pin 8, which carries the color cartridge corresponding to the upper color marking of the pressure element 26 or the sliding casing 30. When the pressure element 26 or 26' is pressed, the pendulum 19 is pushed forward and its forward end 20 is led into the corresponding longitudinal bore 7 of the guide part 5 thru the conical recess 10 and the conical projection 21, whereupon it presses the cartridge bearing bolt 8, which is in it, forward, and thus brings the selected color cartridge 14 into the writing position. When the pressure element 26 or 26' is released, the pressure pin 15 is locked approximately in the position according to FIGS. 2 and 4 by means of ball 25 displaceable in the circular recess 24 of the threaded bush 2 and in the guide recess of the curved bush 22. After a repeated pressing of the pressure element 26 or 26' and the locking of the pressure pin 15 which takes place simultaneously the springs 12 and 17 guide all the parts again into the original or starting position as shown in FIGS. 1 and 3.

The above-described multicolor pencil is arranged for receiving and actuating four color cartridges. It may obviously be made for use with two, three, five and more color cartridges by inserting guide parts with more or less longitudinal bores. It can, however, be also set for three and two color cartridges without changing the guide part 5, in a manner described below.

Figure 7:
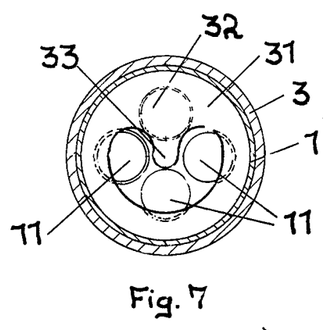
FIG. 7 is a plan view, partly in section, of a guide ring for three color cartridges.

According to FIG. 7 a guide ring 31, instead of guide ring 9, is inserted for three cartridges. The guide ring 31 covers one of the longitudinal bores with a passing through part 32 and which has a nose 33 directed towards the center. The nose extends outwardly with a semicircular part, so that it guides the point of the control pendulum onto a semicircle which extends through the central lines of the three employed bores.

Figure 8:
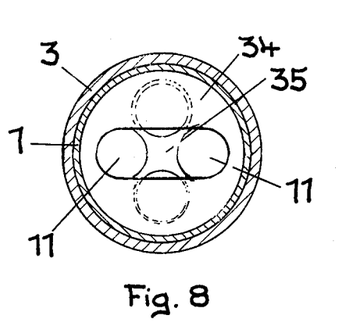
FIG. 8 is a plan view, partly in section, of a guide ring for two color cartridges.

According to FIG. 8, a guide ring 34 is inserted for only two color cartridges which is limited to a recess extending over two opposite longitudinal bores and thus uncovers both of the other oppositely disposed longitudinal bores.

As shown in FIGS. 9, 10, and 11, 12, the guide parts containing the longitudinal bores may be designed in such a manner that they will take over exclusively the guidance of the control pendulum and render the additional guide rings unnecessary.

Figure 9:
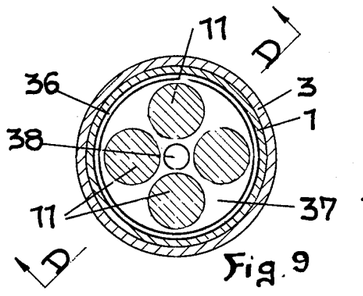
FIG. 9 is a plan view of a guide part, partly in section, provided with a semispherical recess.
Figure 10:
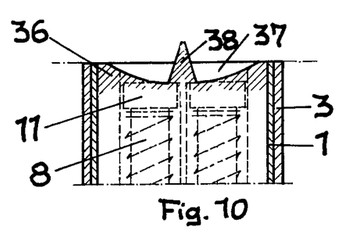
FIG. 10 is a sectional view similar to that of FIG. 9 taken on line D—D of FIG. 9.

The guide part 36, shown in FIGS. 9 and 10, comprises a spherical shell-like recess 37, in the center of which is disposed a conical point 38. The control pendulum in this case is introduced with greater security into each lower longitudinal bore.

Figure 11:
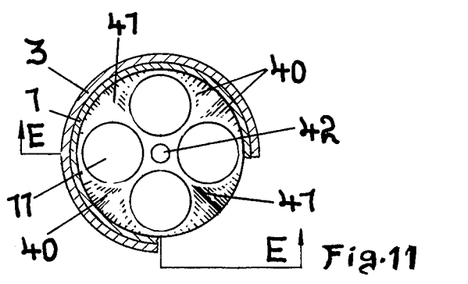
FIG. 11 is a plan view of a guide part provided with saddles.
Figure 12:
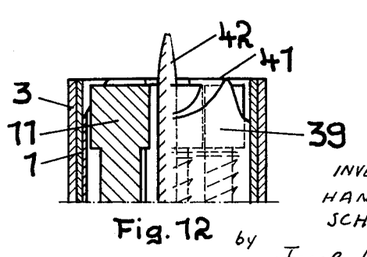
FIG. 12 is a view in cross-section similar to that of FIG. 11, taken on line E—E of FIG. 11.

FIGS. 11 and 12 illustrate a guide part 39, whose inner terminal surface is divided into four sectors, each of which is provided with a saddle-shaped depression. These depressions adjoin laterally the radial edges 41 which are constructed as blunt edges. These guide laterally the pendulum end partially adjoining them with absolute security into the bores corresponding to the chosen color cartridges. Here, too, is provided a central conical projection 42 in order to prevent a swinging through the center.

Figure 13:
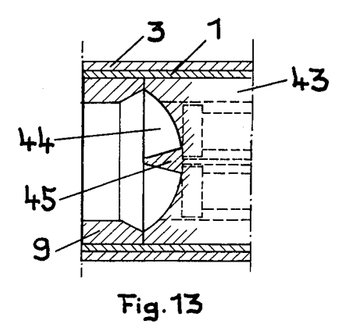
FIG. 13 is a partial longitudinal section of the guide part according to FIGS. 1–4 and 6.
Figure 14:
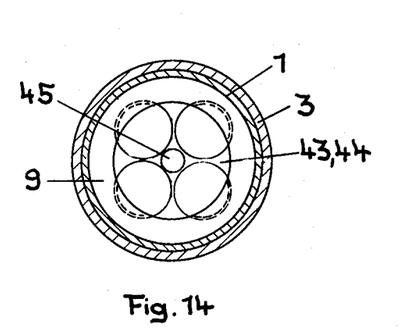
FIG. 14 is a plan view of the guide part according to FIGS. 1–4 and 6.

The guide elements illustrated in FIGS. 13 and 14 correspond substantially to those of the embodiments according to FIGS. 1–4 and 6. Here, however, the guide part 43, having longitudinal bores is provided with a deep spherical shell-like recess 44 and a correspondingly high conical projection 45.

Figure 15:
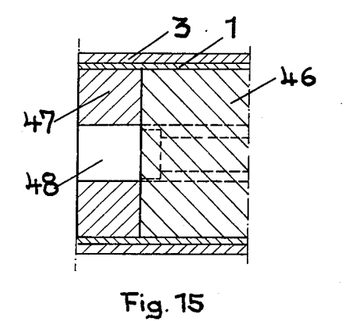
FIG. 15 is a longitudinal sectional view of a guide part for two closely adjacent longitudinal bores.
Figure 16:
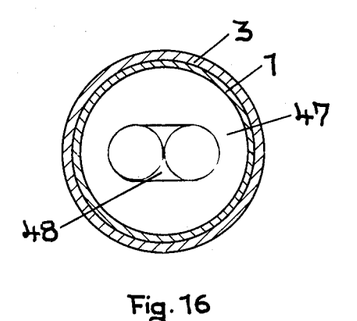
FIG. 16 is a longitudinal sectional view of a guide ring for two closely adjacent longitudinal bores.

FIGS. 15 and 16 illustrate a guide part 46 comprising two longitudinal bores disposed closely to one another and a guide ring 47 appertaining thereto, with a corresponding short recess 48.

Figure 17:
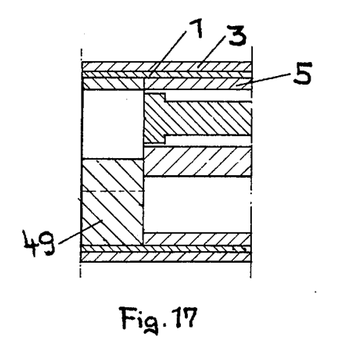
FIG. 17 is a longitudinal section of a guide part comprising four longitudinal bores.
Figure 18:
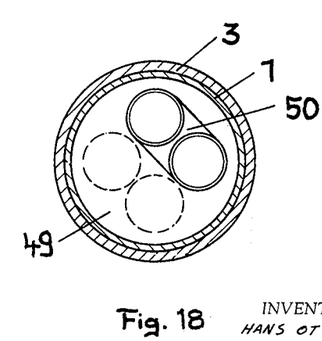
FIG. 18 is a plan view, partly in section, of a guide ring covering two adjacently disposed bores.

Finally, according to FIGS. 17 and 18, it is possible to apply a guide ring 49 to the guide part 36 which has four longitudinal bores, the ring 49 having a recess 50 extending over two adjacent longitudinal bores.

Figure 19:
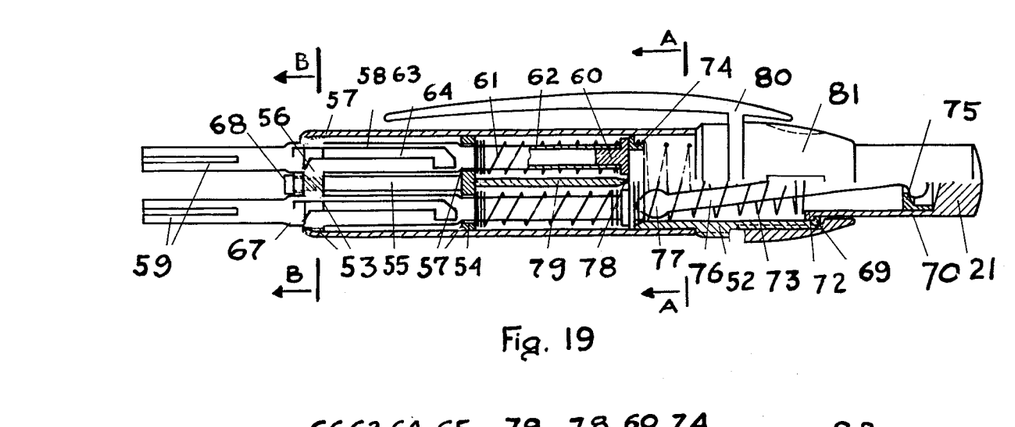
FIG. 19 is a longitudinal view, partly in section, of another embodiment of a multicolor ball-point pen in retracted position.
Figure 20:
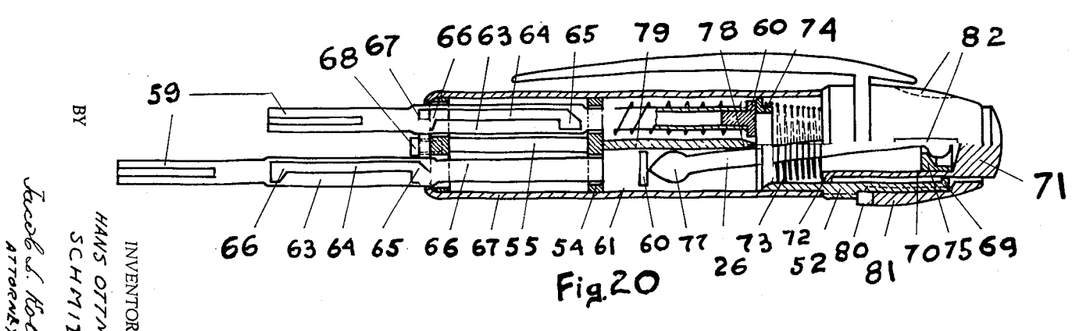
FIG. 20 is a view similar to FIG. 19, showing the cartridge carrier and the pressure member in operation.

The multicolor ball-point pen shown in FIGS. 19 and 20 has a jacket 51, flanged at the forward end and a threaded bush 52 fixedly secured thereto, and on which may be screwed on a protecting casing of desired design (not shown). A guide part is provided in jacket 51 which comprises an outer guide flange joined at the circular edge, an inner guide flange 54 and a cylindrical spacer 55. These parts can also constitute a unitary plastic body.

Figures 21, 22:
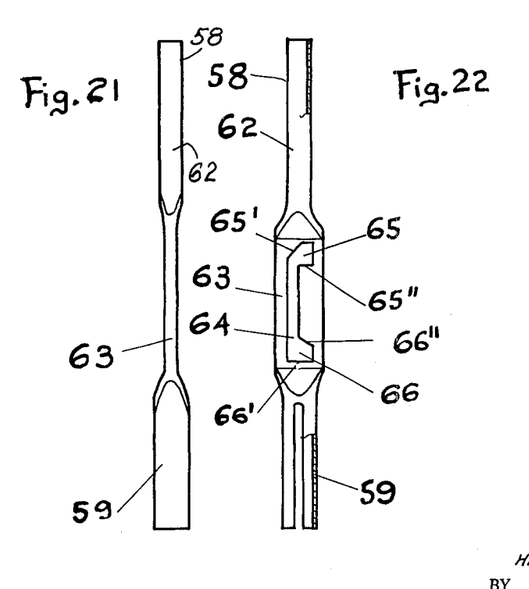
FIG. 21 is a view in side elevation of the cartridge carrier.
FIG. 22 is a view in side elevation similar to FIG. 21 turned 90° relative to FIG. 21.
Figure 23:
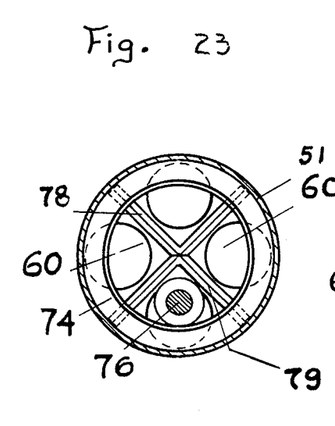
FIG. 23 is a cross-sectional view taken on line A—A of FIG. 19.
Figure 24:
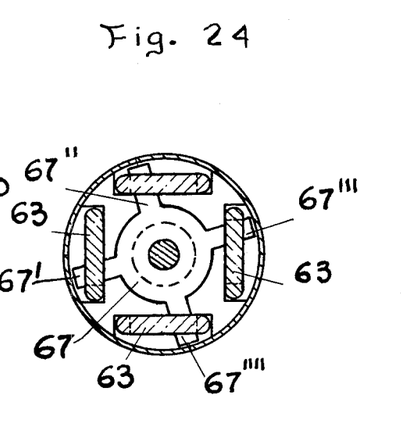
FIG. 24 is a cross-sectional view taken on lines B—B of FIG. 19.

The guide flanges 53, 54 have openings 56 and 57, through which the cartridge carriers 58 project outwardly. These cartridge carriers are provided with outer slit tube parts 59 which serve for attaching the color cartridge, inner tube parts 62 provided with inserted heads 60 and are under the influence of cylindrical return guide springs 61 and flattened out middle portions 63. As in FIGS. 21 and 22, these are provided with longitudinal grooves 64 which open at the upper and lower ends in extended recesses 65 and 66. While the upper recesses 65 have a diagonal edge 65' and on the other side a right angle detent nose 65'', the lower recesses 66 have lower edges 66'' on the side on which the upper recesses 65 are formed as detent noses 65'''.

Radial arms 67', 67", 67''', 67'''', of a selector wheel 67 extend into the longitudinal slits 64, which wheel, for example, is rotatably connected by means of a head or slit screw 68 with the lower guide flange 53.

A lower hollow cylindrical insert 70 of a pressure member 71 is longitudinally displaceable in the threaded bush 52, which together with an inner arcular projection 69 of the threaded bush 52, limits the rearward movement of the pressure member 71. The latter is under the influence of a conical spring 73 which abuts at the projection 77 of the pressure projection 70 and which is braced against a ring portion 74, joined underneath at the inner edge of the threaded bush and disposed in the casing 51.

A collar 75 is mounted in the interior of the hollow cylindrical projection 70 of the pressure member 71. A control pendulum 76 is hung freely swingable in the collar. The ball shaped end 77 of the control pendulum extending into a dull point, swings inwardly of the ring part 74 about a circular path which passes through the middle lines of the cartridge carriers. The control pendulum end 77 disposes itself on the part of the inner surface of the casing 51 when the multicolor ball point is in a diagonal or horizontal position. A guide piece is disposed between the ring part 74 and the inner guide flange 54 which consists of two intersecting edges disposed diagonally to the pendulum end. It can be crimped in, in different ways as in the first embodiment example.

A cover casing 81 is screwed on the rearmost end of the threaded bush 52 through the introduction of a holding clip 80. The casing bears radial color markings corresponding to the color cartridges adjacent these.

Figure 25:
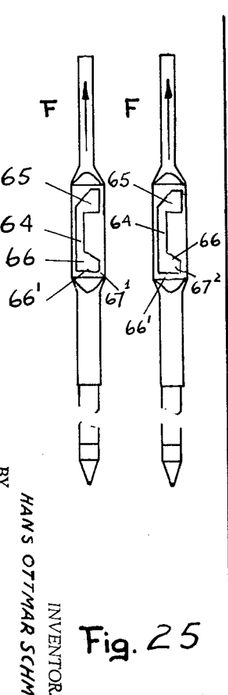
FIGS. 25–29 are schematic representations of two adjacent cartridge carriers in various positions during the displacement of the pressure member.

The above described arrangement operates as follows:

In the operating position shown in FIGS. 18 and 25, all cartridge carriers 58, in particular the pair shown in FIG. 25, are pressed down by the spring force F exerted by its cylindrical return spring 61 and is held in the initial and rest position. In this position, as shown in FIG. 25, the bottom edges 66' of the lower recesses 66 of slits 64 of all cartridge carriers are held in engagement with the corresponding arms 67' and 67" from below by means of the spring force F of the star wheel 67.

Figure 26:
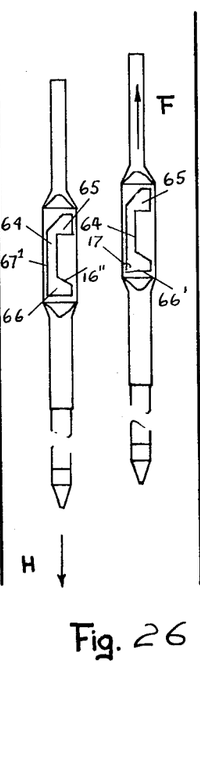

Now a writing cartridge is to be brought into writing position and particularly that of the cartridge carrier shown on the left of FIGS. 25 to 29. After the pen is turned into the position in which the marking 82 with the desired cartridge color is on top, the pressure member 71 is moved forward and down, as shown in FIG. 20. The end 77 of the impact pendulum 76 thereby moves the selected cartridge carrier 58 with its lower part against the force of the return spring 61 without the casing 51. At the beginning of this movement, the diagonal edge 61" of the lower recess 66 of the corresponding slot 64 moves the arm 67' to the left, so that the star wheel 67, as seen from the front, is rotated in a counterclockwise direction and also moves to the left the remaining arm, e.g. arm 67" in the lower recesses 66 of slot 64 of the remaining cartridge carrier. While now, as shown in FIG. 26, the actuated, left cartridge carrier is moved further in the direction of arrow H and then lengthwise guides with its longitudinal slit 64 at the corresponding arm 67' the remaining cartridge carriers remain in the rest position, since they pressed with the lower edges 66' against the corresponding arms 67" and so on, by the springs with the force F. The impact or push pendulum 76 reaches the position shown in FIG. 20. Its conical spring 73 and the return guide spring 61 of the moving cartridge carrier are pressed together.

Figure 27:
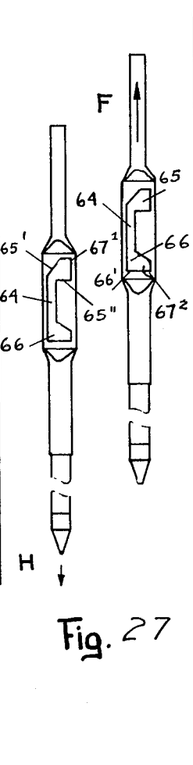

At the end of the thrust movement of the moving cartridge carrier, the upper diagonal edge 65' moves the corresponding arm 67' of the star wheel 67 to the right into the position shown in FIG. 27. Simultaneously the arms 67" etc., corresponding to the remaining cartridge carriers are also moved to the right, due to the rotation of the star wheel in clockwise direction.

Figure 28:
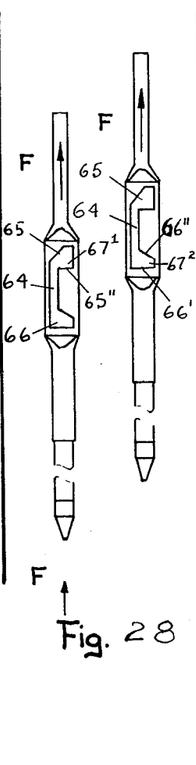

Should the pressure member 71 now be released, so that it and the impact pendulum 76 is returned by the conical spring 73 into the original position, then the return spring 61 of the moving cartridge carrier will be released and it moves the cartridge carrier into the position shown to the left of FIG. 28. In this position, the detent 65" of the upper recess 65 is pressed by the spring's force in the direction of the arrow F against the arm 67', so that the pressed writing cartridge, the star wheel 67 and all other cartridge carriers are locked in its now assumed position.

Figure 29:
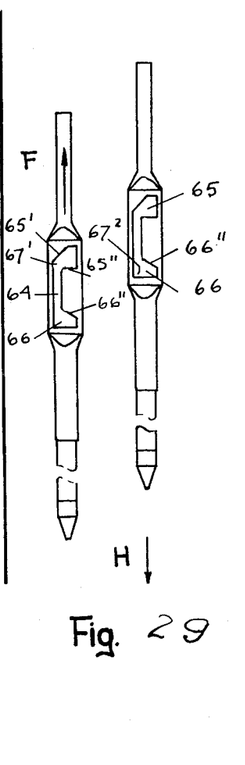

Should now another writing cartridge be brought into working position, then the pressure member 71 is to be moved again into the corresponding position of the pen and through it the impact pendulum of the cartridge carrier bearing the selected color cartridge is to be moved forward. This is shown in FIG. 27 in the case of the cartridge on the right. Here the arm 67" at the diagonal edge 66" of the lower recess 66 of the right cartridge carrier moved to the left, so that it is found in the region of the longitudinal slot 64. Since the arm 67' pertaining to the left cartridge carrier is simultaneously turned to the left, it renders free the detent 65" of the left cartridge carrier. While now therefore the right cartridge carrier moves down and forward in the manner shown for the left cartridge carrier in FIGS. 26 to 28 and is locked in this end position, the force F of the return spring of the released, left cartridge carrier brings the latter upward as shown in FIG. 29. The upper diagonal edge 65' then moves the arm 67' to the right and thus influences a movement of the arm 67" in a similar direction. This rests behind the detent 65" of the left cartridge carrier and detains it in the writing position.

What I claim is:

1. In a multicolor ball-point pen, a cartridge selecting and propulsion unit, said unit comprising a cylindrical sleeve, a plurality of cartridge guides displaceable in one end of said sleeve, means for securing ball-point cartridges of different colors to said cartridge guides, guide means for said cartridge guides, a pendulum in said sleeve for selectively propelling said cartridge guides outwardly of said sleeve, said pendulum being displaceable in a longitudinal and conical path, a pressure member extending through the other end of said sleeve into the sleeve's interior and displaceable in a longitudinal and circular path, said pendulum being pivotally secured to said pressure member, first spring means biasing said pressure member outwardly of said sleeve, second spring means biasing said cartridge guides inwardly of said sleeve, ball point cartridges differing in color, secured to said guides by said means, means for indicating the color of a selected cartridge and a cylindrical housing detachably secured outwardly of said unit, said housing having a frusto-conical open end portion for the passage of a predetermined one of said cartridges, said unit when removed from said housing being adapted for insertion into one of a plurality of appropriate housings, said guide means comprising a pair of spaced guide discs having a plurality of aligned openings, an axially disposed spacer therebetween, said cartridge securing means extending through said openings, an axially disposed guide pin extending from one of said discs towards said pendulum, said second spring means comprising spiral springs enclosing said cartridge guides a flange for pivotally supporting said pendulum, said axially disposed guide pin being of cross-shaped section and having beveled edges said means for securing said cartridges to said guides being slotted tubular elements secured to said guides, said guides having inwardly extending tubular portions terminating as circular shoulders and flat portions and a selector wheel provided with recesses for engaging one of said flat portions.

2. The device according to claim 1, wherein said cartridge guides and said guide pin are formed as a unit by pressing.

3. The device according to claim 1, wherein said cartridge guides are formed as a unit by moulding.

4. The device according to claim 1 wherein said cartridge guides are formed as a unit by injection moulding.

References Cited by the Examiner

UNITED STATES PATENTS 2,837,057   6/1958   Morlock et al. ______ 120—42.13

FOREIGN PATENTS

| 980,908 | 1/1951 | France. |
| 985,667 | 3/1951 | France. |
| 1,023,101 | 12/1952 | France. |
| 1,251,883 | 12/1960 | France. |
| 1,022,123 | 1/1958 | Germany. |
| 919,590 | 2/1963 | Great Britain. |

EUGENE R. CAPOZIO, *Primary Examiner.*

LAWRENCE CHARLES, *Examiner.*